(12) United States Patent
Villaverde Calva

(10) Patent No.: US 11,599,923 B2
(45) Date of Patent: Mar. 7, 2023

(54) SYSTEM AND METHOD FOR ORDERING OF GOODS OR SERVICES VIA VIDEO CONFERENCE WITH ESTABLISHMENT ATTENDANT OR VIRTUAL AVATAR

(71) Applicant: Jimmy Villaverde Calva, Santa Ana, CA (US)

(72) Inventor: Jimmy Villaverde Calva, Santa Ana, CA (US)

( * ) Notice: Subject to any disclaimer, the term of this patent is extended or adjusted under 35 U.S.C. 154(b) by 0 days.

(21) Appl. No.: 17/572,194

(22) Filed: Jan. 10, 2022

(65) Prior Publication Data

US 2022/0383374 A1     Dec. 1, 2022

Related U.S. Application Data

(60) Provisional application No. 63/194,207, filed on May 28, 2021.

(51) Int. Cl.
| | | |
|---|---|---|
| *G06Q 30/06* | (2012.01) | |
| *G06Q 30/0601* | (2023.01) | |
| *G06Q 50/12* | (2012.01) | |
| *G06T 13/40* | (2011.01) | |

(52) U.S. Cl.
CPC ......... *G06Q 30/0617* (2013.01); *G06Q 50/12* (2013.01); *G06T 13/40* (2013.01)

(58) Field of Classification Search
None
See application file for complete search history.

(56) References Cited

U.S. PATENT DOCUMENTS

| | | |
|---|---|---|
| 5,907,275 A | 5/1999 | Battistini et al. |
| 6,844,893 B1 | 1/2005 | Miller et al. |
| 9,020,476 B2 | 4/2015 | Leipzig et al. |
| 9,367,217 B2 | 6/2016 | Moore, Jr. |
| 9,818,150 B2 | 11/2017 | Rhoads et al. |
| 2002/0147647 A1 | 10/2002 | Ragsdale-Elliott et al. |
| 2007/0038727 A1 | 2/2007 | Bailey et al. |
| 2009/0167553 A1 | 7/2009 | Hong et al. |
| 2010/0250707 A1 | 9/2010 | Dalley et al. |
| 2011/0004481 A1* | 1/2011 | Jones ................ G06F 3/0488 705/1.1 |
| 2011/0246334 A1 | 10/2011 | Schoenberg et al. |
| 2014/0249937 A1 | 9/2014 | McNally |

(Continued)

OTHER PUBLICATIONS

R. V. Cox, C. A. Kamm, L. R. Rabiner, J. Schroeter and J. G. Wilpon, "Speech and language processing for next-millennium communications services," in Proceedings of the IEEE, vol. 88, No. 8, pp. 1314-1337, Aug. 2000, doi: 10.1109/5.880086. (Year: 2000).*

(Continued)

*Primary Examiner* — Michelle T Kringen
(74) *Attorney, Agent, or Firm* — Bold IP, PLLC; Christopher Mayle

(57) ABSTRACT

A system and method for an ordering system whereby a first user may remotely purchase goods and services from a second user by live stream video chat whereby the second user may then transmit the order to an establishment or other location, allowing first users to interact and connect with another person in a pleasant manner via video chatting, such as enabling the first user to order from a remote location to the second user who also may be at another location with respect to the establishment.

19 Claims, 4 Drawing Sheets

(56) References Cited

U.S. PATENT DOCUMENTS

| | | |
|---|---|---|
| 2016/0260145 A1 | 9/2016 | High et al. |
| 2017/0364836 A1 | 12/2017 | Li |
| 2020/0106991 A1 | 4/2020 | Kaus |
| 2020/0286161 A1 | 9/2020 | Marguello |
| 2021/0288927 A1* | 9/2021 | Wang .................. G06F 3/048 |

OTHER PUBLICATIONS

Costa N, Domingues P, Fdez-Riverola F, Pereira A. A mobile Virtual Butler to bridge the gap between users and ambient assisted living: a Smart Home case study. Sensors (Basel). Aug. 6, 2014; 14(8): 14302-29. doi: 10.3390/sl40814302. PMID: 25102342; Pmcid: PMC4179076 (Year: 2014).*

"Video Chat Takeout Ordering for Restaurants," DennisExpress. https://www.dennisexpress.com/taking-customer-orders-with-video-chat/ [Date accessed: Feb. 15, 2021].

* cited by examiner

SYSTEM AND METHOD FOR ORDERING OF GOODS OR SERVICES VIA VIDEO CONFERENCE WITH ESTABLISHMENT ATTENDANT OR VIRTUAL AVATAR

CROSS REFERENCE TO RELATED APPLICATIONS

This application claims priority to U.S. Pat. No. 63/194,207 filed on May 28, 2021, which is incorporated in its entirety.

FIELD OF DISCLOSURE

The overall field of this invention is a system and method for ordering goods and services, and more particularly, a system and method for placing, processing, and transmitting orders for remotely ordered goods and services to an establishment to be delivered to a user by a preferred attendant connected over a communications network.

BACKGROUND

For quick-service restaurants around the country, the reality of business after coronavirus is becoming clear. More than eight million restaurant employees have been laid off or furloughed in recent months. The challenges facing restaurants from fast food to fine dining, and everywhere in between, are simply unprecedented. Restaurants had to adopt digital tools to stay alive. Currently, there are many remote digital ordering systems available that allow a person to place an order for goods or services over their mobile devices. However, these applications do not solve the problem of people not interacting with someone to take their order in a friendly manner that is pleasant on the eyes for the user. Restaurant systems also have prolonged waits when ordering over the phone that deter users from ordering. Thus, there still exists a great need for an improved process and system for mobile ordering.

SUMMARY

The present invention is directed to a method for completing a video order, the method including receiving, by a video ordering system, an order over a network initiated by a first user using a first user computing device, the order indicating an establishment, the video ordering system having one or more processors; one or more memory devices coupled to the one or more processors; and one or more computerized programs, whereby the one or more computerized programs are stored in the one or more memory devices and configured to be executed by the one or more processors, the one or more computerized programs including instructions for connecting, by the video ordering system, one or more attendants on a second user computing device to the first user in a communication connection to take the order of the first user for the establishment, directing, by the video ordering system, the order to an establishment computing device for the establishment or agents of the establishment to fulfill the order for the first user, selecting an attendant of the one or more attendants from a pool or queue to connect with the first user whereby the one or more attendants are remote from the establishment, selecting an attendant of the one or more attendants in response to a selection from the first user on the first user computing device, categorizing the one or more attendants based on look or appearance, associating the one or more attendants for preference for a specialty type corresponding to the establishment, associating the one or more attendants with the establishment in response to the establishment selecting the one or more attendants, storing one or more schedules for the one or more attendants with days and times to receive connection requestions from the video ordering system, utilizing a time module to determine a pre-set time period has elapsed in the communication connection.

The present invention is directed to a system for completing an order on a video ordering system, the video ordering system having one or more processors; one or more memory devices coupled to the one or more processors; and one or more computerized programs, whereby the one or more computerized programs are stored in the one or more memory devices and configured to be executed by the one or more processors, the one or more computerized programs including instructions for receiving the order over a network initiated by a first user on a first user computing device, the order indicating an establishment, connecting an attendant to the first user to take the order of the first user for the establishment, directing the order to an establishment computing device for the establishment or agents of the establishment to fulfill the order for the first user, constructing a virtual avatar to represent the establishment, modeling the virtual avatar from a famous person, modeling the virtual avatar from a real person attendant of the establishment, modeling a look and appearance for the virtual avatar in response to a theme or aesthetic of the establishment, constructing one or more specified dialogue trees for the virtual avatar, outputting the one or more specified dialogue trees for the virtual avatar, outputting the one or more specified dialogue trees for the virtual avatar audibly through a speaker of the first user computing device by an audio module, recognizing voice input from the first user by the audio module, analyzing the voice input from the first user by the audio module to determine one or more answers to the voice input from the one or more specified dialogue trees, outputting the one or more answers, detecting an occurrence of an event involving interaction between the first user and the virtual avatar; changing the one or more specified dialogue trees for the virtual avatar to one or more second specified dialogue trees in response to the interaction; and outputting an indication of the one or more second specified dialogue trees, detecting an occurrence of a previous order from the first user; changing an appearance of the virtual avatar to one or more second appearances in response to the previous order from the first user; and outputting the one or more second appearances, detecting a specific time period; changing an appearance of the virtual avatar to one or more second appearances in response to the specific time period; and outputting the one or more second appearances, detecting a time period between a previous order from the first user and a present order; changing an appearance of the virtual avatar to one or more second appearances in response to the time period; and outputting the one or more second appearances, constructing the virtual avatar in response to the establishment passing a predetermined amount of customers over a predetermined time period.

BRIEF DESCRIPTION OF DRAWINGS

The overall field of this invention is a system and method for ordering goods and services, and more particularly, a system and method for placing, processing, and transmitting orders for remotely ordered goods and services to an establishment to be delivered to a user by another user connected over a communications network.

The present invention will be described by way of exemplary embodiments, but not limitations, illustrated in the accompanying drawings in which like references denote similar elements, and in which.

DETAILED DESCRIPTION

Figure 1:
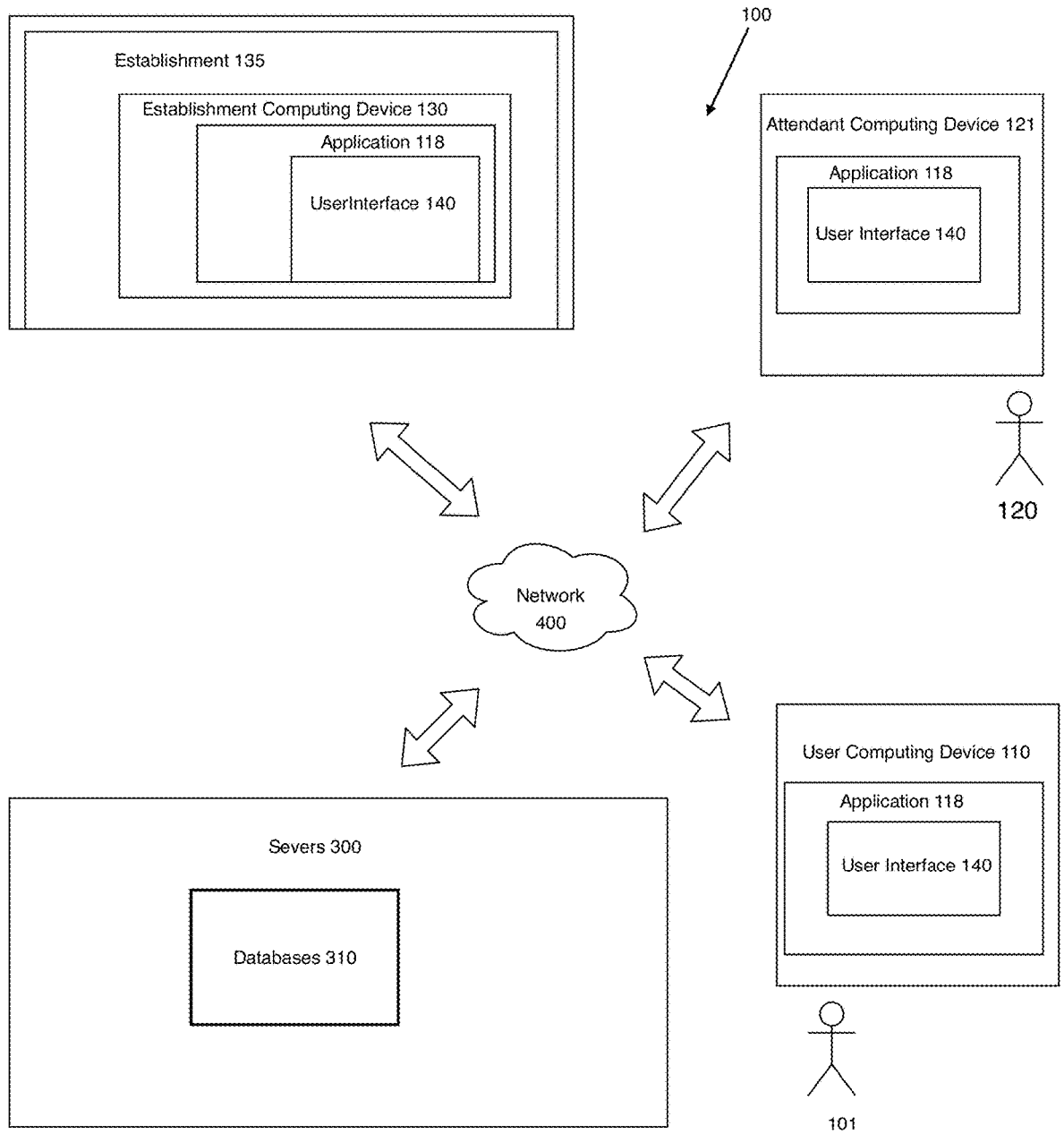
FIG. 1 depicts a schematic diagram of a video ordering system according to an illustrative embodiment.

In the Summary above and in this Detailed Description, and the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

"Exemplary" is used herein to mean "serving as an example, instance, or illustration." Any aspect described in this document as "exemplary" is not necessarily to be construed as preferred or advantageous over other aspects Throughout the drawings, like reference characters are used to designate like elements. As used herein, the term "coupled" or "coupling" may indicate a connection. The connection may be a direct or an indirect connection between one or more items. Further, the term "set" as used herein may denote one or more of any item, so a "set of items" may indicate the presence of only one item or may indicate more items. Thus, the term "set" may be equivalent to "one or more" as used herein.

In the following detailed description, numerous specific details are set forth in order to provide a more thorough understanding of the one or more embodiments described herein. However, it will be apparent to one of ordinary skill in the art that the invention may be practiced without these specific details. In other instances, well-known features have not been described in detail to avoid unnecessarily complicating the description.

The present disclosure recognizes the unsolved need for an improved system and method for an ordering system, particularly an application where a first user may remotely purchase goods and services for a second user by live stream video chat whereby the second user may then transmit the order to an establishment or other location. One of the many objectives of the present embodiments is that users can interact and connect with another person in a pleasant manner via video chatting, such as enabling the first user to order from a remote location to the second user who also may be at another location with respect to the establishment. There are many possible applications of the one or more embodiments described herein. In particular, using this application, a user can buy goods and services from other users connected to establishment by one or more social media sites or other avenues.

Turning to FIG. 1, FIG. 1 depicts a block diagram of an embodiment of the present invention for video ordering system 100. Video ordering system 100 may include a plurality of establishments such as establishments 135. Establishments 135 may be locations where users 101 may place an order with through an attendant or designated representative 121 over a live video chat or communication. An order may be a request for one or more goods or services. For example, goods may include but are not limited to a drink or meal and services may be but are not limited to a massage or dancing lesson, which is placed in connection with the purchase of the goods or service. Any type of establishment offering any type of goods or services may be available. Further, establishments 135 may be located in various geographical locations that are either located apart or are located in proximity to each other.

Establishments 135 may provide for an assortment of unique and diverse selections for users 101 to select from when communicating with attendant 121. Users 101 may use one or more user computing devices 110 to communicate with an attendant 121 who is using one or more attendant computing devices 120 whereby attendants 121 may then transmit the order to establishments 135 on one or more establishment computing devices 130. In some embodiments, establishment computing device 130, user computing device 110, and attendant computing device 120 may be in communication with one or more servers 300 over one or more networks 400.

In one or more embodiments, network 400 may include a local area network (LAN), such as a company Intranet, a metropolitan area network (MAN), or a wide area network (WAN), such as the Internet or World Wide Web. Network 400 may be a private network, a public network, or a combination thereof. Network 400 may be any type of network known in the art, including telecommunications network, a wireless network (including Wi-Fi), and a wireline network. Network 400 may include mobile telephone networks utilizing any protocol or protocols used to communicate among establishment computing devices 130, attendant computing devices 120, and user computing devices 110, such as GSM, GPRS, UMTS, AMPS, TDMA, or CDMA. In some embodiments, different types of data may be transmitted via network 400 via different protocols.

Network 400 may further include a system of terminals, gateways, and routers. Network 400 may employ one or more cellular access technologies including 2nd (2G), 3rd (3G), 4th (4G), 5th (5G), LTE, Global System for Mobil communication (GSM), General Packet Radio Services (GPRS), Enhanced Data GSM Environment (EDGE), and other access technologies that may provide for broader coverage between computing devices and establishment computing devices if, for instance, they are in a remote location not accessible by other networks.

User computing devices 110, attendant computing devices 120, and establishment computing devices 130 may be any type of computing device known to those of ordinary skill in the art. Computing devices are preferably mobile computing devices such as an iPhone, Android-based phone, or Windows-based phone. Establishment computing devices 130 are preferably a tablet, however, this is non-limiting and these computing devices may be a computing device such as a phone, tablet, desktop computer, laptop computer, wearable device, or smart home device, which are able to connect to network 400 and to retrieve data for placing an order.

User computing devices 110, attendant computing devices 120, and establishment computing devices 130 may include any number of components operatively connected in a computing device, including, without limitation, a processor, a memory, and communication component such as an antenna and communication interface for wireless communications, one or more input and/or output (I/O) components and/or interfaces, and one or more sensors.

User computing devices 110, attendant computing devices 120, and establishment computing devices 130 may have an analog video camera (camcorder), a digital video camera, a digital still camera, or other technology capable of outputting moving or still image content, as well as audio signals in a compatible video format such as, for example, JPEG (Joint Photographic Experts Group), GIF (Graphics Interchange Format) or MPEG (lotion Picture Experts Group) formats for coupling with a computer device.

User computing devices 110, attendant computing devices 120, and establishment computing devices 130 may have location tracking capabilities such as Mobile Location Determination System (MLDS) or Global Positioning System (GPS) whereby the computing devices may include one or more satellite radios capable of determining the geographical location of the computing devices. User computing devices 110, attendant computing devices 120, and establishment computing devices 130 may utilize GPS to confirm the validity of location information.

Users 101, attendants 121, and/or authorized agents of establishments 135 may initially start a session by launching video ordering application 118 on user computing devices 110, attendant computing devices 120, and establishment computing devices 130. In other embodiments, users 101, attendants 121, and/or authorized agents of establishments 135 may initially commence a session by going to a predefined website address or domain name. In other embodiments, user computing devices 110, attendant computing devices 120, or establishment computing devices 130, may have video ordering application 118 already downloaded onto the computing devices.

A user interface 140 may be displayed on a video ordering application 118. User interface 140 may be included with video ordering application 118. Video ordering application 118 may be downloadable and installable on user computing devices 110, attendant computing devices 120, and establishment computing devices 130. In some embodiments, video ordering application 118 may be preinstalled on user computing devices 110, attendant computing devices 120, and establishment computing devices 130 by the manufacturer or designer. Further, video ordering application 118 may be implemented using a web browser via a browser extension or plugin.

Video ordering system 100 may operate on one or more servers 300 located at a remote data center or any other location suitable for providing service to a network. Servers 300 may include one or more databases 310. Video ordering system 100 may be distributed across multiple servers that may be in the same location or different locations in any arrangement. Server 300 may have several databases, including a database for storing data for users' profiles.

Servers 300 may comprise a number of modules that provide various functions related to video ordering system 100 using one or more computing devices similar to user computing devices 110, attendant computing devices 120, and establishment computing devices 130. Modules may be in the form of software or computer programs that interact with the operating system of server 300 whereby data collected in databases may be processed by one or more processors within server 300 or another component of video ordering system 100 as well as in conjunction with execution of one or more other computer programs.

Modules may be configured to receive commands or requests from user computing devices 110, attendant computing devices 120, and establishment computing devices 130 and communicate appropriate responses to requesting computing devices. Severs 300 may have a control module with appropriate firmware or software and an operating system to control overall operation and configuration of the video ordering system 100. The control module may be operable communication with a network interface module which provides interface functionality over one or more networks (wired or wireless) and possibly connectivity with other communication media.

The control module may also be communication with an audio module and a video module which receive and process audio and video data, respectively, from attendant computing devices 120 and user computing devices 110. The audio module may include, among other modules or components for processing audio data, speech detection and recognition modules and codecs for processing incoming or outgoing video data. A speech detection module can be configured to detect instances of speech at a site (for example, to trigger recording or other functions of the video ordering system 100), and/or determine the relative physical location of the detected speech for use in controlling the operation of individual microphones at the site. Speech recognition may be used to distinguish between individual voices for the purpose of filtering out another voice.

The video module may include image recognition modules for use in detecting speech or distinguishing between attendant 121 and user 101 and appropriate codecs for use in processing incoming or outgoing video data. The image recognition modules may include face tracking or pattern recognition algorithms. The audio and video modules may also include, respectively, interfaces for data communication between input units such as microphones and cameras, and output units such as speakers and display screens. The selection and implementation of appropriate speech and video modules, including codecs and speech detection/recognition modules, image recognition modules, including appropriate encoding, decoding, and compression algorithms, are those understood by those of ordinary skill in the art. Video ordering system 100 may also be equipped with security modules providing end-to-end security with other systems and intermediate host systems.

Figure 2:
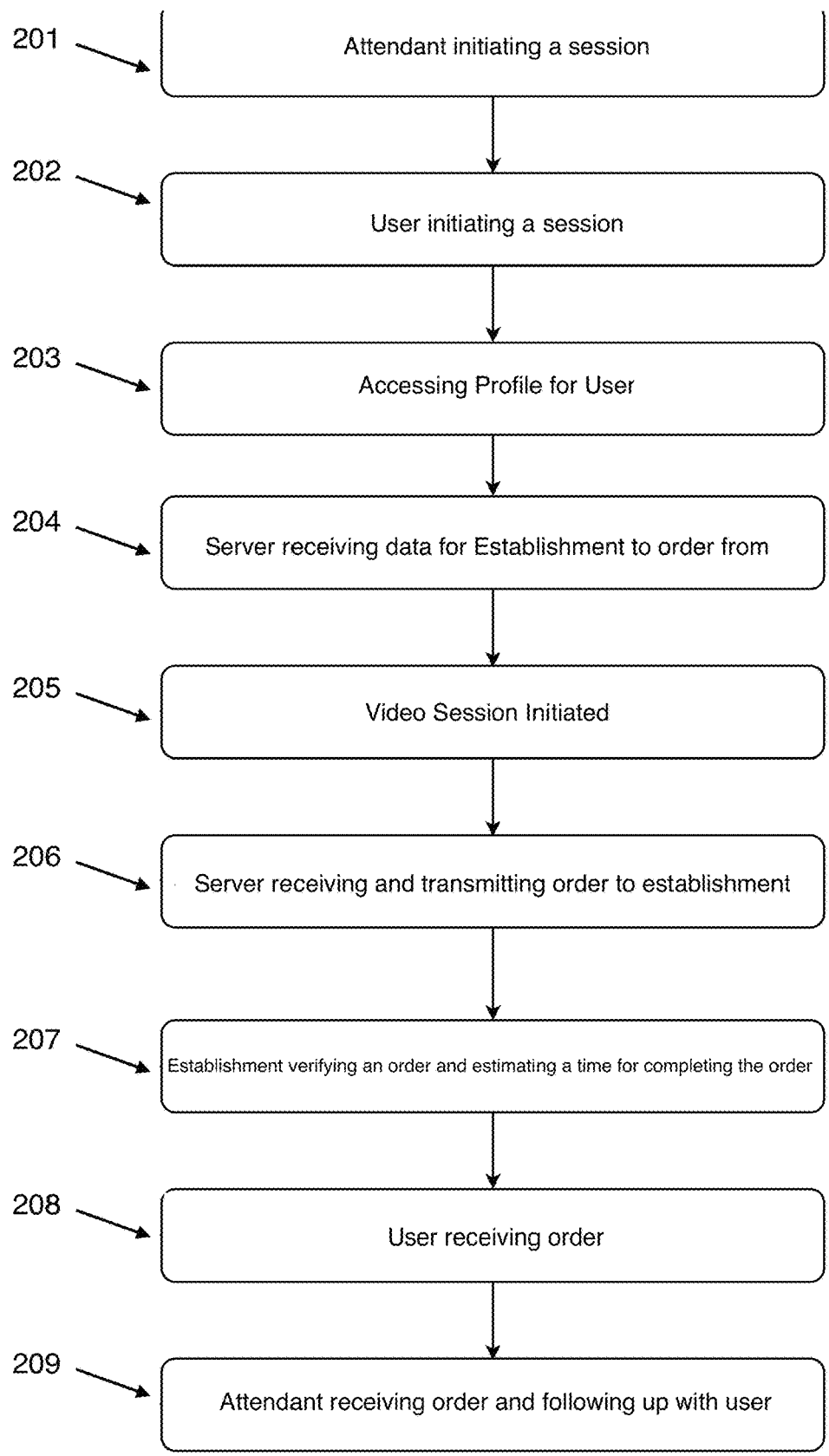
FIG. 2 depicts a flow diagram of a video ordering system according to an illustrative embodiment.

Turning to FIG. 2, FIG. 2 depicts a flow diagram showing an embodiment of an exemplary method for implementing video ordering system 100. One or more components included in FIG. 1, such as, without limitation, user computing devices 110, attendant computing device 120, establishment computing device 130, and network 400 are utilized in this method.

Establishments 135 may initially register to become a registered establishment associated with video ordering application 118 such that its goods and services may be available for attendants 121 to place the orders for users remotely by video ordering application 118. Upon initially signing up with video ordering application 118, establishments 135 may be prompted to provide information along with a requested password. Information may be the hours, directions, promotional content, contact information, corporate structure, and reservations of establishment 135. When registering with video ordering application 118, establishments 135 may also be able to log into video ordering application 118 using login credentials from other social networking platforms, such as, for example, logging in with a Yelp® profile.

User interface 140, may provide information and options for establishments 135 to input relevant information associated with its goods and services, including, without limitations, images related to goods and/or services, available selections, quantity, and/or promotional material that may be viewed by other users 101. In other embodiments, a developer or designer may input a unique establishment 135 profile into databases 310 for connecting with users 101 and receiving order information.

Selections such as goods and services may be uploaded from establishment computing device 130 by staff or employees of establishment 135 to databases 310. An updated list of selections provided by establishment 135 may be inputted manually through user interface 140 by staff or employees to databases 310 or establishment computing device 130 may connect to an available establishment inventory system to provide information about available goods and or services selections. For example, if establishment 135 provides food and wants to include relevant portions or all of its menu, establishment 135 may include selections currently available based on the time of day (such as food only available during brunch and food only available during dinner) among other inputs such as current product inventory to assure that all the necessary ingredients are available before allowing it to be uploaded to the menu. In some embodiments, if particular goods or services are available but not a specific ingredient (such as a tomato in a cheeseburger) the goods or services may still be uploaded to the menu, however the unavailable component would not be included in the list of possible choices.

At step 201, a method may include an attendant 121 initiating a session over network 400 with attendant computing device 120. The session may be initially started by attendant 121 launching and running video ordering application 118 on attendant computing device 120 installed by attendant 121 through a manufacturer prescribed process such as downloading video ordering application 118 from an application store or video ordering application 118 may be preinstalled by the manufacturer or designer. In some embodiments, attendant 121 may navigate to a specific web address to initiate a session.

When attendant 121 initially registers to become a registered user of video ordering application 118, attendant 121 may be prompted to provide some personal information along with a requested account name and password, such as, without limitation, his or her name, age (e.g., birth date), gender, interests, contact information, home town, address, preferences of food, favorites establishments, skills, professional organizations, or relationship status. In some embodiments, when registering a user account, video ordering application 118 may allow attendant 121 to access and interact with video ordering application 118 using login credentials from other social networking platforms. For example, in some embodiments, it may be useful and convenient for users of video ordering application 118 to be able to log in using credentials or sign in information from another social media application, such as Facebook® or Instagram® or the like. This is advantageous for users who do not wish to have to learn or provide multiple login information.

Attendants 121 may be requested to take pictures of themselves whereby server 300 collects and stores pictures of each user in databases 310 to display to other users through user interface 140. Pictures may be for identification purposes during navigation of a session and to enhance the authenticity of the process by ensuring that the picture is of the correct, intended user when ordering goods or services. Attendants 121 may couple, link, or connect with user accounts from social networking websites and internal networks. Examples of social networking websites 300 but are not limited to Instagram®, Facebook®, LinkedIn®, Snapchat®, and Twitter®.

Figure 3:
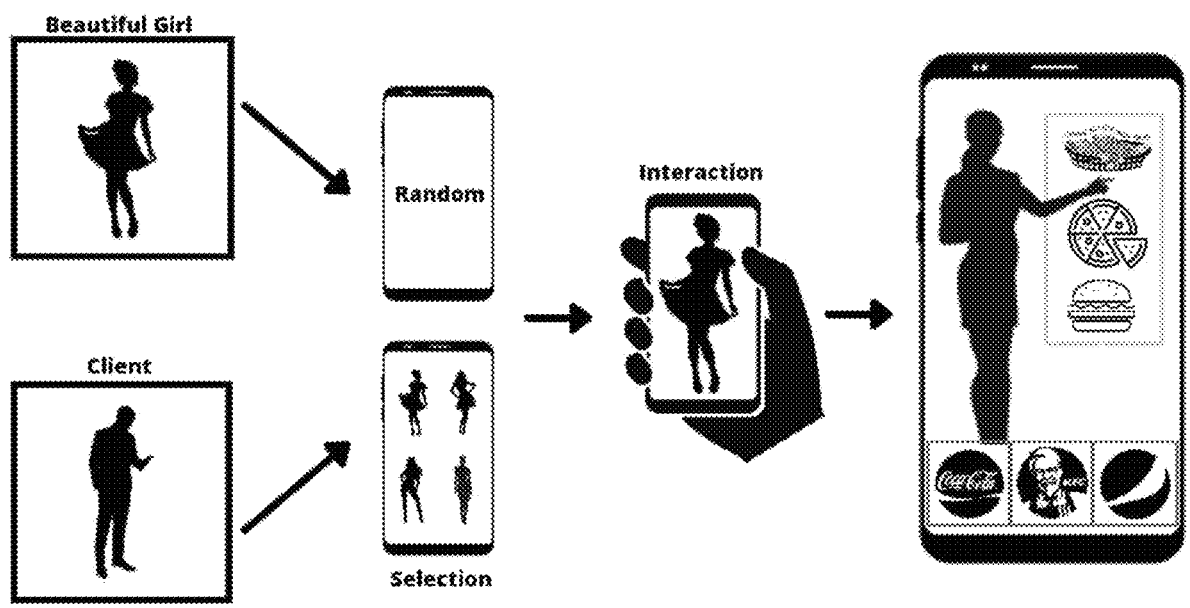
FIG. 3 depicts a user interface of the video ordering system.
Figure 4:
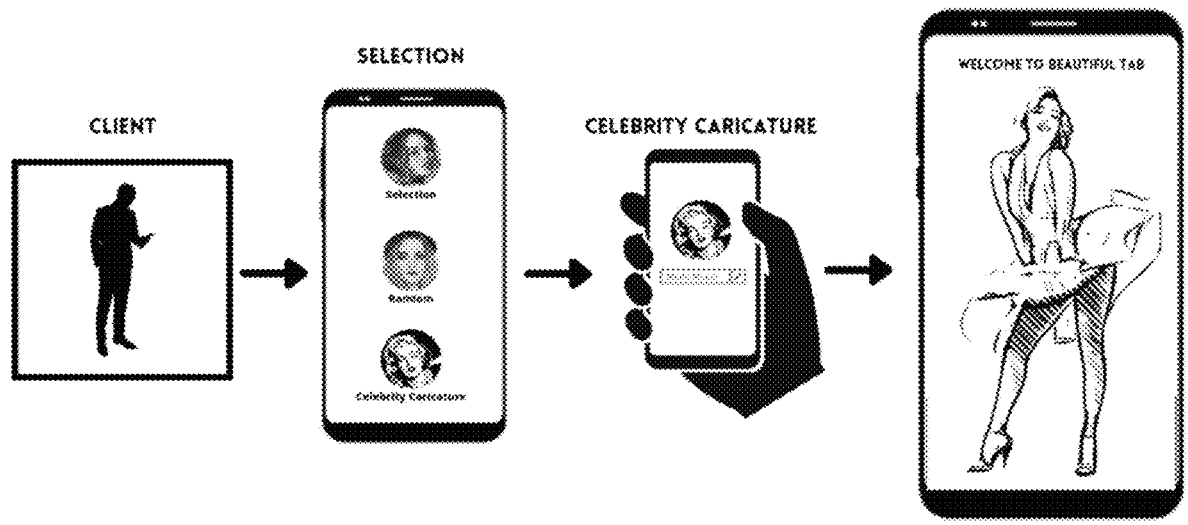
FIG. 4 depicts the celebrity replication of the video ordering system.

There are numerous ways attendants 121 may be connected with an establishment 135 to represent the establishments 135 and take orders for users 101 over video chat communication. Video ordering system 100 may position all of the attendants 121 in a pool or queue when they notify system they are available to take orders for any establishments 135 whereby once a user 101 initiates an order, an attendant 121 will be randomly chosen, as illustrated in FIG. 3. In some embodiments, users 101 may visualize what attendants 121 are available and select one of them to initiate an order. Video ordering system 100 may store previous information related to users 101 and which attendants 121 they talked to such that those attendants 121 are more likely to be chosen to be connected to users 101. Attendants 121 may be categorized based on look or appearance as well as specialty such that for an Italian restaurant an Italian woman is more likely to be chosen to provide a more authentic feel whereby this information is stored in databases 310. This may be done by manual insertion by attendants 121 or image recognition. Users 101 may request for specific attendants 121 whereby attendants 121 may receive notifications that they are being requested. In further embodiments, attendants 121 may already be workers for establishments 135.

Establishments 135 and attendants 121 may also connect with one another individually so attendants 121 may become more accustomed to the specific establishment 135. User interface 140 may include a selectable button for establishments 135 to add attendants 121. After selecting the add attendants 121 button, user interface 140 may display a search window whereby establishment 135 may search for attendants 121 from the pool of attendants 121. A search request having a character string may be entered into the search window by establishment 135 whereby sever 300 may receive this request and then display one or more attendants 121, identified using their name, picture, or other metadata related to attendants 121. If establishment 135 wants to add an attendant 121 to establishment's 135 attendant list, establishment 135 selects the option to request that attendant 121. Attendant 121 may then confirm this request whereby they would be added to the list of available attendants 121 able to take orders from users 101. Attendants 121 may input various schedules through user interface 140 such that they would only receive notifications for video chats for mobile ordering by users 101 at specific times during the day or specific days whereby this information is stored in databases 310. In a similar manner, attendant 121 may add establishments 135 to their list whereby establishments 135 must confirm their request.

At step 202, a method may include a user 101 initiating a session over network 400 with user computing device 110. The session may be initially started by user 101 launching and running video ordering application 118 on user computing device 110 installed by user 101 through a manufacturer prescribed process such as downloading video ordering application 118 from an application store or video ordering application 118 may be preinstalled by the manufacturer or designer. In some embodiments, users 101 may navigate to a specific web address to initiate a session.

At step 203, the method may include accessing a user profile for user 101. In one embodiment, the user profile may reside in databases 310 on server 300, which may be accessed and referenced using an identifier provided by user 101 as part of the registration process or login process such as an account name and password.

When user 101 initially registers to become a registered user of video ordering application 118, user 101 may be prompted to provide some personal information along with a requested account name and password, such as, without limitation, his or her name, age (e.g., birth date), gender, interests, contact information, home town, address, preferences of food, favorites establishments, skills, professional organizations, or relationship status. In some embodiments, when registering a user account, video ordering application 118 may allow user 101 to access and interact with video ordering application 118 using login credentials from other social networking platforms. For example, in some embodiments, it may be useful and convenient for users of video ordering application 118 to be able to log in using credentials or sign in information from another social media application, such as Facebook® or Instagram® or the like. This is advantageous for users who do not wish to have to learn or provide multiple login information.

User 101 may be requested to take pictures of themselves whereby server 300 collects and stores pictures of each user in databases 310 to display to other users through user interface 140. Pictures may be for identification purposes during navigation of a session and to enhance the authenticity of the process by ensuring that the picture is of the correct, intended user when ordering goods or services. Users 101 may couple, link, or connect with user accounts from social networking websites and internal networks. Examples of social networking websites 300 include but are not limited to Instagram®, Facebook®, LinkedIn®, Snapchat®, and Twitter®.

At step 204, the exemplary method may include server 300 receiving data pertaining to the specific establishment 135 where user 101 wishes to order from. Server 300 may send a data request to user computing device 110, displayed through the user interface 140, for identifying a geographic location of user computing device 110 or a network location of user computing device 110, as well as a timestamp identifying when the request was transmitted to user computing device 110. The geographic location may be any physical location, which may be expressed in longitudinal and latitudinal coordinates, and may include other dimensions and factors such as altitude or height for determining an exact position of the geographic location.

In other embodiments, user 101 may input zip codes, city, county, state names, landmarks, or other important locations through the user interface 140 to identify the geographical location of user computing device 110. User interface 140 may display all available establishments 135 registered and stored within server 300 that are in the general area or in near proximity to user's 101 geographic location. In one or more embodiments, establishments 135 may be displayed on a map. The map may be displayed to user 101 with establishments 135 displayed as markers, pins, or identifiers at their respective geographic locations.

Establishments 135 may also be displayed through a list or a drop-down menu from which users 101 may be able to select. The user profile for users 101 may be associated with an establishment's 135 social networking system such as a loyalty program account. A loyalty program account may provide various points and benefits that translate to savings and other desirable incentives for a user that is part of the loyalty program account.

In some embodiments, users 101 may search for a specific establishment 135 using a name or category to locate a nearby establishment. For example, a search request having a character string may be entered whereby one or more establishments may be identified using name, type of goods and/or services provided, or other metadata. Further, the closest establishment matching the search request may be provided that is located within some threshold distance of the user's current geographic location. For example, if users 101 want to locate a nearby pizza restaurant for ordering its goods and services associated with video ordering application 118, users 101 may type "pizza" with a search request through user interface 140. Server 300 may access databases 310 and return a list of nearby pizza stores shops. In another example, if users 101 wants to locate a tavern named "Chuck's" for ordering its offered goods and services associated with video ordering application 118, users 101 may type "Chuck's" with a search request through user interface 140. Accordingly, a list of nearby taverns named "Chuck's" may be provided to the user in response to his or her search.

Users 101 may input additional text or changes to the existing search request through user interface 140 to receive an updated list of establishments based on the newly entered text. The search request may also include other parameters, such as categories, price, distance, already visited establishments, and/or establishment hours. Further, in some embodiments, these parameters as well as others may be automatically factored in when a search request is conducted. User interface 140 may provide the ability to adjust and select parameters that may be used to filter and/or rank the results of the establishments displayed to the user 101.

At step 205, the exemplary method may include initiating a session on video ordering application 118 with establishment 135 whereby one or more attendants 121 may be chosen to act as a representative of establishment 135 and communicate with user 101. Once a communication has been established, attendants 121 may interact with and communicate with users 101 through user interface 140 as well as browse and select goods or services provided as possible selections that are associated with the establishment's profile that may be stored in the databases as well as view one or more previous favorites selected by users 101. These selections may be displayed through a list or a drop-down menu on user interface 140 of attendant's 121 video ordering application 118. The menu may also be displayed on a separate window user interface 140 where in some embodiments users 101 may interact with the menu while communicating with attendants 121.

To place an order, attendant 121 may select a particular set of goods and or services on behalf of user 101. Selections may have nested hyperlinks for linking and to provide additional details to learn about the goods or services. For example, an available menu of choices may have a selection for citrus based drinks with a list of the different citrus drinks. By selecting the name, picture or price, the menu would provide additional information on that selection including a larger image with details.

Menu assortment may be simplified to facilitate the selection of goods and services by filtering options provided through user interface 140. The selected filter category may cause the menu list to only display selections from the selected category, such as only drinks or gluten free foods. Optionally, establishment's 135 operators may choose to define promotional items that can be displayed at the top of the menu. Further, previous selections chosen by users 101 may be retained in databases 310 and displayed at the top of the menu. In some embodiments, menu options may be displayed to attendant 121 based upon users 101 information collected by server 300 and stored in databases 310, such as price range, contact preferences and allergies, and demographics, to intelligently present the menu and provide selections that would be appealing to the user.

User interface 140 may provide attendants the option to select if users 101 wants the order to be processed and delivered immediately or picked up by users 101 or, alternatively, provide the option for users 101 to select a particular date and time for the order to be delivered or picked up by users 101. Accordingly, it may be possible for users 101 to place an order in advance, in which case the order is placed in a pre-order list until the designated time.

User interface 140 may display to users 101 a final order summary in a separate window, the price information including subtotal, discounts and taxes, promotional coupon and gift card entry fields, gratuity or tipping field for attendant 121, mode of payment, and calculated total including subtotal combined with taxes, discounts, and gratuity added. User 101 may input their credit card information for a credit card using any credit card known in the art, including, without limitation an ATM card, a VISA®, MasterCard®, Discover®, or American Express® card in a credit card input field, or can alternatively use PayPal® or the like. Users 101 may submit the payment information via an appropriate button through user interface 140 or return to an earlier step in the session.

User interface 140 may provide the ability to obtain one or more images of the credit card associated with the financial transaction. Images of the credit card may be captured by camera on user computing device 110 whereby video ordering application 118 may have access to the images. Images may include a front image of the credit card and back image of the credit card. Sever 300 may collect and store pictures of one or more credit cards of each user in database 302 for subsequent use. In some embodiments, images and the extracted details of the credit card may be deleted from the memory immediately or shortly after a transaction has been completed or terminated, while in further embodiments, temporarily stored credit card data may be encrypted and compressed for added security and stored on databases 301 for subsequent use whereby user interface 140 may allow users 101 select from previously used credit cards.

During video chat, server 300 may utilize a timing module that will determine whether a first pre-set time period has elapsed since the start of the chat, if affirmative, the video module will terminate by either stopping providing video streaming or cutting off the live video communications between attendant computing device 120 and user computing device 110.

In place of or in addition to a live attendant, video ordering system 100 may construct a virtual avatar to be used as a representative of establishment 135. This may be created by 3-D modeling programs known by those of ordinary skill in the art that may utilize the creation and/or implementation of programming models through the use of a data processing API or the like and are preferably implemented in a high level procedural or object oriented programming language to communicate with a computer system.

In some embodiments, an avatar may be a computer-generated image. In other embodiments, an avatar may be a digital image, such as a video capture of a person. An avatar may be modeled on a famous figure, celebrity, or, in some embodiments, the avatar may be modeled on real person attendants 121 associated with video ordering system 100 such as previous waiter and waitresses of the establishment 135. In some embodiments, a virtual avatar may be constructed using one or more algorithms and machine learning based on the specific establishments 135. For instance, virtual avatars may be generated to have the look and appearance to compliment the theme or aesthetic of establishments 135 (such as an Asian character for an Asian restaurant).

Virtual avatars work similar to real life avatars but have built in timing and one or more specified dialogue trees to provide questions and answers to users 101. An audio module may recognize speech from users 101 whereby the phrases are analyzed and an answer is produced by a virtual avatar in response to users 101. Responses by the virtual avatar may be trained to generate responses to statements based on location of establishment, time, day, or other factors. Each time users 101 order from a specific establishment, the same virtual avatar may be used to communicate. In some embodiments, virtual avatars may be designated to appear for video chat communication on specific days or hours. These days or hours may be selected by establishment 135 for days they require more or less customers. This information may be determined by connected databases of establishment, receipts, or manual insertion by establishment 135.

Video ordering system 100 may construct appearances of virtual avatars based on one or more algorithms whereby the appearances are based on the user's ordering patterns. Video ordering system 100 may recognize that user 101 has ordered from this restaurant before whereby after each additional video chat communication, the virtual avatar may then be generated with an updated appearance such as a new haircut, new earrings, different outfits, etc. as well as an updated dialogue tree with a modification to answers. The updated appearance and dialogue tree may also be altered in correspondence with the day and time as well as be updated only after predetermined number of orders or after a predetermined amount of time between orders. This provides a more natural feel that will help users be more at ease with a more lifelike construct.

At step 206, the method may include server 300 receiving an order over network 400 initiated by attendants 121 on user interface 140. The order may indicate the user profile ordering, the target establishment, the user contact recipient, and one or more selections chosen by the user, message sent by the user, and payment information. The payment information is then submitted and confirmed (e.g., by server 300 in one exemplary embodiment) for processing of the payment. While server 300 is processing the payment, the appropriate systems or providers are contacted in order to complete the transaction and payment is transferred from users 101 to establishment 135. If the payment successfully transfers from users 101, a confirmation message may be displayed to the confirm the time of purchase and the total price charged as well as the approximate time the selections may be redeemed by users 101. If payment is declined, a failure message may be displayed to the users 101, notifying users 101 of the reason for the failed transaction. After the transaction is completed, a digital receipt of payment may be stored in databases 310.

The order is then transmitted to establishment computing device 130 of the establishment 135 for presentation via user interface 140 to employees in order to fulfill the order. If establishment 135 has multiple establishment computing devices 130, the method may include displaying the order to multiple establishment computing devices 130 instead of just one or transmitting the order to a specific establishment computing device 130 of the multiple establishment computing devices 130 associated with a particular establishment 135 that would be responsible for providing selections on that specific the order. Establishment computing device 130 may have unique identification markers to enable establishment computing device 130 to be distinguished from one another to decrease confusion.

At step 207, the method may include verifying an order and estimating a time for completing the order by establishment 135. User interface 140 may provide the employee or staff at establishment 135 an option to cancel the order, which is then received by the server 300, whereby server 300 cancels the order and sends a notification to users 101. User interface 140 may also provide fields for the staff or employee to input the reason for the cancellation, which may be transmitted to server 300 and then to user computing device 110 to be displayed to users 101 through user interface 140 as well as recorded and stored in databases 310 for subsequent use.

An example for this situation to occur would be if establishment 135 no longer could fulfill the order because they lack the ingredients or because establishment 135 cannot fulfill the order for any other reason (e.g., establishment 135 will be closed when the order needs to be fulfilled). The cancellation message may then be transmitted to and displayed as a message through user interface 140 to users 101, notifying users 101 the order has been cancelled and that their payment will be returned. The approximate time for completion may be estimate-based, at least in part, on prior pending orders existing at establishment computing device 130 and previous completion times for the exact or similar order. The approximate time of completion and designated pickup point in establishment 135 may be transmitted to server 300 over the network and then transmitted and displayed through user interface 140 to users 101.

At step 208, the exemplary method may include user 101 arriving at designated pickup point and receiving the completed order or establishment 135 delivering the order to users 101 at a designated location. Users 101 may verify the content of the order by comparing the content of the order on user interface 140 with the produced selections presented by establishment 135. Completed delivery of the order by establishment 135 to users 101 may be verified, in one exemplary embodiment, by scanning an optical bar code, a QR code, a RFID tag, or other suitable identification technology displayed on user interface 140, which can automatically promote the status of the order to completed. This may be achieved using an optical bar code, a QR code, or a RFID tag reader connected to establishment-computing device 130 or another device on the network 400. Users 101 may choose to have a receipt or invoice sent to them as a printed receipt, via e-mail, text message, hyperlink, or other type of message connected to the server where a virtual image of the receipt is stored in databases 310.

At step 209, the exemplary method may include receiving a confirmation of a received order displayed on user interface 140 to attendants 121 in at least some examples. After fulfilling an order, user interface 140 may then display a notification after a predetermined amount of time to attendants 121 to reconnect video chat with users 101 after a designated amount of time. The notification may be sent via email, text message or a link to a web site. Once connected, attendants 121 may ask users 101 about the individual good or service in the order as well as the service provided by establishment 135 in completing the transaction. This notification process may be completed multiple times based on the amount of goods and services users 101 ordered or the length and time it takes to consume those goods and services. Attendants 121 checking in multiple times provides a more authentic experience similar to a traditional restaurant or other business.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the use contemplated.

What is claimed is:

1. A method for completing a video order, the method comprising:

receiving, by a video ordering system, an order over a network initiated by a first user using a first user computing device, the order indicating an establishment, the video ordering system having one or more processors and one or more databases; one or more memory devices coupled to the one or more processors; and one or more computerized programs, wherein the one or more computerized programs are stored in the one or more memory devices and configured to be executed by the one or more processors, the one or more computerized programs including instructions for:

connecting, by the video ordering system, one or more attendants on a second user computing device to the first user in a communication connection to take the order of the first user for the establishment;

receiving audio and video from the first user on a camera on the first user computing device and the one or more attendants on a second camera on the second user computing device while in a video conference;

processing audio and video data using speech detection and recognition modules;

presenting a menu of the establishment to the one or more attendants and the first user during the video conference; and directing, by the video ordering system, the order received from the menu of the second user computing device to an establishment computing device over the network for the establishment or agents of the establishment to fulfill the order for the first user.

2. The method of claim 1, further comprising:

receiving a notification from the second user computing device that the one or more attendants are available for the video conference; and selecting an attendant of the one or more attendants from a queuing system to connect with the first user wherein the one or more attendants are remote from the establishment.

3. The method of claim 1, further comprising: selecting an attendant of the one or more attendants in response to a selection from the first user on the first user computing device wherein the first user is presented selectable icons corresponding to the one or more attendants wherein the presented selectable icons are pictures of the one or more attendants;

storing information in the one or more databases corresponding to the first user and which of the one or more attendants the first user had the video conference with; and modifying odds that the one or more attendants that had the video conference before is chosen again.

4. The method of claim 1, further comprising: categorizing the one or more attendants based on look or appearance using one or more image recognition modules; and corresponding the look or the appearance with a type of the establishment wherein the look or the appearance of the one or more attendants.

5. The method of claim 4, further comprising:

determining one or more preferred menu items in response to collected user profile information of the first user including price range and allergies; and presenting the one or more preferred menu items.

6. The method of claim 5, wherein the menu is presented on a separate window during the video conference.

7. The method of claim 1, further comprising: receiving one or more schedules from the one or more attendants on the second user computing device; and storing the one or more schedules for the one or more attendants with days and times to receive connection requisitions from the video ordering system.

8. The method of claim 1, further comprising:

determining the order has been fulfilled;

notifying the one or more attendants, after a determined time it takes to consume one or more goods or services of the order, to reconnect the video conference with the first user; and reconnecting the video conference with the first user in response to the order being fulfilled.

9. A system for completing an order on a video ordering system, the video ordering system having one or more processors; one or more memory devices coupled to the one or more processors; and one or more computerized programs, wherein the one or more computerized programs are stored in the one or more memory devices and configured to be executed by the one or more processors, the one or more computerized programs including instructions for:

receiving the order over a network initiated by a first user on a first user computing device, the order indicating an establishment;

connecting an attendant to the first user to take the order of the first user for the establishment on a video conference;

directing the order to an establishment computing device for the establishment or agents of the establishment to fulfill the order for the first user; and constructing a virtual avatar to represent the establishment for the video conference.

10. The system of claim 9, determining one or more preferred menu items on a menu of the establishment in response to collected user profile information of the first user including price range and allergies; and presenting the one or more preferred menu items.

11. The system of claim 10, wherein the menu is presented on a separate window during the video conference.

12. The system of claim 9, the one or more computerized programs further including instructions for determining the order has been fulfilled; and reconnecting the video conference with the first user in response to the order being fulfilled after a determined time it takes to consume one or more goods or services of the order.

13. The system of claim 9, the one or more computerized programs further including instructions for: constructing one or more specified dialogue trees for the virtual avatar; and outputting the one or more specified dialogue trees for the virtual avatar.

14. The system of claim 13, the one or more computerized programs further including instructions for: outputting the one or more specified dialogue trees for the virtual avatar audibly through a speaker of the first user computing device by an audio module;

recognizing voice input from the first user by the audio module;

analyzing the voice input from the first user by the audio module to determine one or more answers to the voice input from the one or more specified dialogue trees; and outputting the one or more answers.

15. The system of claim 9, utilizing a time module to determine a pre-set time period has elapsed in the video conference; and terminating the video conference after the pre-set time period.

16. The system of claim 9, the one or more computerized programs further including instructions for:

determining a number of previous orders from the first user; and changing an appearance of the virtual avatar to one or more second appearances with an updated dialogue tree in response to ordering passing a predetermined amount; and outputting the one or more second appearances during the video conference.

17. The system of claim 9, the one or more computerized programs further including instructions for: determining one or more preferred menu items in response to collected user profile information of the first user including price range and allergies; and presenting the one or more preferred menu items.

18. The system of claim 9, the one or more computerized programs further including instructions for: determining a time period between a previous order from the first user and a present order; changing an appearance of the virtual avatar to one or more second appearances in response to the time period passing a predetermined amount; and outputting the one or more second appearances during the video conference.

19. The system of claim 9, the one or more computerized programs further including instructions for determining a predetermined time that requires more or less than a predetermined number of customers for the establishment; and presenting the virtual avatar during that predetermined time, the predetermined time determined from connected databases of the establishment.

* * * * *